(12) United States Patent
Hayashi

(10) Patent No.: US 11,630,614 B2
(45) Date of Patent: Apr. 18, 2023

(54) INFORMATION PROCESSING APPARATUS, IMAGE PROCESSING METHOD, AND STORAGE MEDIUM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/456,745

(22) Filed: Nov. 29, 2021

(65) Prior Publication Data

US 2022/0171580 A1 Jun. 2, 2022

(30) Foreign Application Priority Data

Nov. 30, 2020 (JP) .............................. JP2020-198275

(51) Int. Cl.
*G06F 3/12* (2006.01)
*G06K 15/02* (2006.01)

(52) U.S. Cl.
CPC .......... *G06F 3/1208* (2013.01); *G06F 3/1256* (2013.01); *G06K 15/1836* (2013.01); *G06K 15/1878* (2013.01)

(58) Field of Classification Search
CPC . G06F 3/1208; G06F 3/1256; G06K 15/1836; G06K 15/1878
USPC .................................................. 358/1.9, 1.15
See application file for complete search history.

(56) References Cited

U.S. PATENT DOCUMENTS

| 2007/0211296 | A1* | 9/2007 | Toda ..................... G06F 3/1275 358/1.18 |
| 2009/0037812 | A1 | 2/2009 | Asai |
| 2014/0368887 | A1* | 12/2014 | Segawa ................. G06T 7/0004 358/3.24 |

FOREIGN PATENT DOCUMENTS

JP 2009-038526 A 2/2009

* cited by examiner

*Primary Examiner* — Quang N Vo
(74) *Attorney, Agent, or Firm* — Workman Nydegger

(57) ABSTRACT

An information processing apparatus includes a processing section that generates, based on image data, print data obtained by performing RIP processing on the image data and preview data smaller in data size than the print data, and a storage section that stores the preview data, in which when an update of a preview of a print image based on the print data is accepted, the processing section updates data used for the preview by using the preview data read from the storage section.

9 Claims, 5 Drawing Sheets

INFORMATION PROCESSING APPARATUS, IMAGE PROCESSING METHOD, AND STORAGE MEDIUM

The present application is based on, and claims priority from JP Application Serial Number 2020-198275, filed Nov. 30, 2020, the disclosure of which is hereby incorporated by reference herein in its entirety.

BACKGROUND

1. Technical Field

The present disclosure relates to an information processing apparatus, an image processing method, and a storage medium.

2. Related Art

An information processing apparatus has been proposed which performs various types of processing for printing by a printer of an ink jet method, an electrophotographic method, or other methods. This type of information processing apparatus converts image data in a raster format or the like which is created, for example, by image editing software into print data suitable for printing by a printer, and inputs the print data to the printer. Processing such as raster image processor (RIP) processing including rasterizing processing is used for the conversion.

According to a technique described in JP-A-2009-38526, preview data is generated in addition to print data based on image data, and an image based on the preview data is displayed as a preview of the print image. Here, the image data and print setting data are used to generate the preview data so that contents of a print setting are reflected in the display of the preview.

According to the technique described in JP-A-2009-38526, when the print setting is changed, to reflect the changed contents in the display of the preview, it is necessary to generate the preview data again using both the image data and the print setting data which are described above. Here, processing such as the RIP processing takes a long time. For this reason, according to the technique described in JP-A-2009-38526, it is difficult to quickly display the preview reflecting the contents after the change of the print setting, and as a result, an issue occurs that usability is lacking. This issue becomes more significant as the data size of the image data increases, and improvement is desired in commercial printing, for example.

SUMMARY

According to an aspect of the present disclosure, there is provided an information processing apparatus including a processing section that generates, based on image data, print data obtained by performing RIP processing on the image data and preview data smaller in data size than the print data, and a storage section that stores the preview data, in which when an update of a preview of a print image based on the print data is accepted, the processing section updates data used for the preview by using the preview data read from the storage section.

According to another aspect of the present disclosure, there is provided an image processing method including generating preview data that is smaller in data size than print data by using raster data obtained by performing rasterizing processing on image data, storing the preview data in a storage section, and updating, when an update of a preview of a print image based on the print data is accepted, data used for the preview by using the preview data read from the storage section.

According to another aspect of the present disclosure, there is provided a non-transitory computer-readable storage medium storing an image processing program for causing a computer to execute generating preview data that is smaller in data size than print data by using raster data obtained by performing rasterizing processing on image data, storing the preview data in a storage section, and updating, when an update of a preview of a print image based on the print data is accepted, data used for the preview by using the preview data read from the storage section.

DESCRIPTION OF EXEMPLARY EMBODIMENTS

Figure 1:
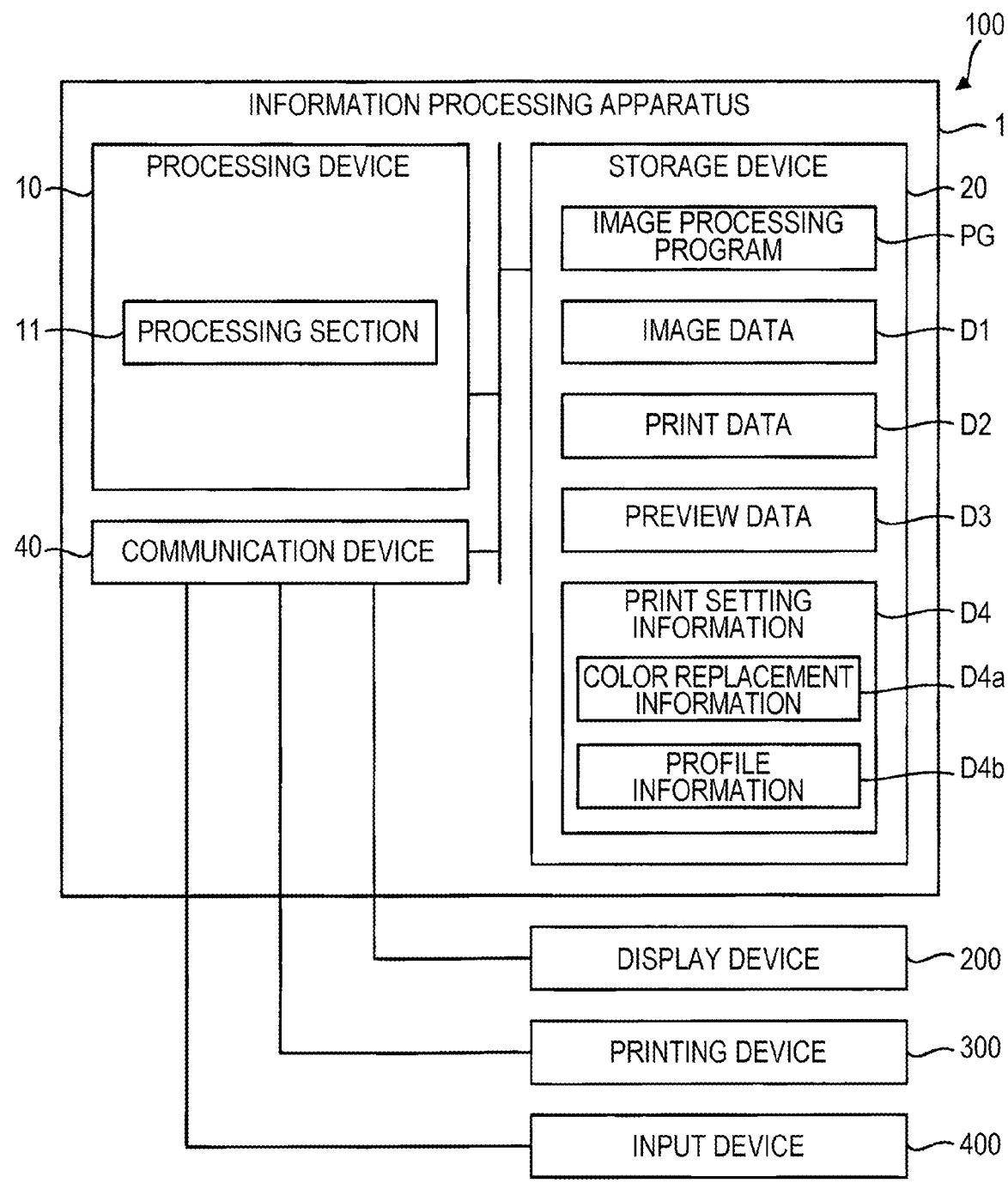
FIG. 1 is a schematic diagram illustrating a configuration example of a system using an information processing apparatus according to an embodiment.

Hereinafter, embodiments of the present disclosure will be described with reference to the accompanying drawings. Note that dimensions or scales of respective parts in the drawings are appropriately different from actual ones, and some parts are schematically illustrated for ease of understanding. Further, the scope of the present disclosure is not limited to these embodiments unless otherwise specified in the following description.

1. Embodiments
1-1. Outline of System 100 Using Information Processing Apparatus 1

FIG. 1 is a schematic diagram illustrating a configuration example of a system 100 using an information processing apparatus 1 according to an embodiment. The system 100 is a system that performs various types of processing related to printing. The system 100 of the present embodiment has a printing function of performing printing and a setting function of performing print setting. The setting function includes a preview function of displaying a preview of a print image, and the preview reflects contents of the print setting. Note that the printing function may be implemented in the system 100 as necessary, and may be omitted.

As illustrated in FIG. 1, the system 100 includes an information processing apparatus 1, a display device 200 that is an example of a "display section", a printing device 300, and an input device 400. The information processing apparatus 1 is communicably connected to each of the display device 200, the printing device 300, and the input device 400 in a wired or wireless manner. Note that the printing device 300 may be omitted, or may be communicably connected via a network including the Internet.

The display device 200 is a device that performs displaying under a control of the information processing apparatus 1. More specifically, the display device 200 displays, for example, an image for various types of settings for printing by the printing device 300, and displays an image based on preview data D3 described later as a preview. For example, the display device 200 is a display device including various types of display panels such as a liquid crystal display panel or an organic electro-luminescence (EL) display panel. Note that the display device 200 may be separate from or integrated with the information processing apparatus 1.

The printing device 300 is a device that performs printing on a printing medium under the control of the information processing apparatus 1. More specifically, the printing device 300 prints an image on the printing medium based on print data D2 described later which is input from the information processing apparatus 1. The printing medium is not particularly limited, and examples thereof include various types of paper, various types of cloths, or various types of films. A printing method of the printing device 300 is not particularly limited, and is, for example, an ink jet method, an electrophotographic method, or other methods. Although not illustrated, the printing device 300 includes, for example, a printer engine of the ink jet method, the electrophotographic method, or other methods, a transport mechanism that transports a printing medium in a predetermined direction, and a control circuit that controls driving of the printer engine and the transport mechanism based on information or the like from the information processing apparatus 1.

The printing device 300 of the present embodiment performs printing using color materials such ink or toner of a plurality of colors. Examples of the plurality of colors include process colors such as cyan, magenta, yellow, and black. The plurality of colors may include a spot color such as a neon color or a metallic color. Note that the number of colors of the color materials is not particularly limited and is optionally selected.

The input device 400 is a device that accepts an operation from a user. For example, the input device 400 includes a touch pad, a touch panel, or a pointing device such as a mouse. Here, when the input device 400 includes the touch panel, the input device 400 may also serve as the display device 200.

The information processing apparatus 1 is a computer that appropriately performs various types of processing necessary for printing by the printing device 300 and display by the display device 200 in response to an operation to the input device 400. Specifically, the information processing apparatus 1 generates data such as print data D2 for use in the printing by the printing device 300 and generates data such as the preview data D3 for use in the display by the display device 200 based on image data D1 input from the outside.

Further, the information processing apparatus 1 has a preview update function, and when the information processing apparatus 1 accepts a preview update, the information processing apparatus 1 uses the preview data D3 instead of the image data D1 to change the data used for the preview on the display device 200. Here, processing load of the preview data D3 is smaller than that of the image data D1. For this reason, by using the preview data D3 to update the preview, it is possible to update the preview more quickly as compared with a case in which the preview is updated using the image data D1. Further, the information processing apparatus 1 can change various types of settings for the printing by the printing device 300, and the display device 200 is caused to display the preview reflecting the changed contents. Hereinafter, a configuration of the information processing apparatus 1 will be described.

1-2. Configuration of Information Processing Apparatus 1

As illustrated in FIG. 1, the information processing apparatus 1 includes a processing device 10, a storage device 20 that is an example of a "storage section", and a communication device 40. These devices are communicably connected to one another.

The processing device 10 is a device having a function of controlling each section of the information processing apparatus 1 and a function of processing various types of data. The processing device 10 includes, for example, a processor such as a central processing unit (CPU). Note that the processing device 10 may be configured by a single processor or may be configured by a plurality of processors. A part or all of the functions of the processing device 10 may be implemented by hardware such as a digital signal processor (DSP), an application-specific integrated circuit (ASIC), a programmable logic device (PLD), or a field-programmable gate array (FPGA).

The storage device 20 is a device that stores various types of programs executed by the processing device 10 and various types of data processed by the processing device 10. The storage device 20 includes, for example, a hard disk drive or a semiconductor memory. Note that a part or all of the storage device 20 may be provided in a storage device, a server, or the like outside the information processing apparatus 1.

An image processing program PG, the image data D1, the print data D2, the preview data D3, and print setting information D4 are stored in the storage device 20 of the present embodiment. The image processing program PG is a program for causing the information processing apparatus 1 to execute an image processing method described later.

The image data D1 is image data created by the image editing software. Specifically, for example, the image data D1 is image data in a file format based on a page description language such as PostScript, Portable Document Format (PDF), or XML Paper Specification (XPS) or in various types of vector formats, image data in a raster format that does not match a processing condition such as an output resolution in the printing device 300, or the like.

The print data D2 is an image data in a format that can be processed by the printing device 300. Specifically, the print data D2 is image data in a raster format that matches a processing condition such as an output resolution in the printing device 300, for example.

The preview data D3 is image data used for displaying a preview on the display device 200. The preview data D3 may be data itself which is processed by the display device 200, or may be original data or intermediate data for generating the data to be processed by the display device 200.

In particular, the preview data D3 is image data that has smaller processing load required for the display on the display device 200 than that of each of the image data D1 and the print data D2. Specifically, the preview data D3 is image data that is smaller in size than the print data D2. For this reason, by using the preview data D3 for displaying the preview, as compared with a case in which the image data D1 or the print data D2 is used, the time required for displaying the preview can be shortened.

Figure 4:
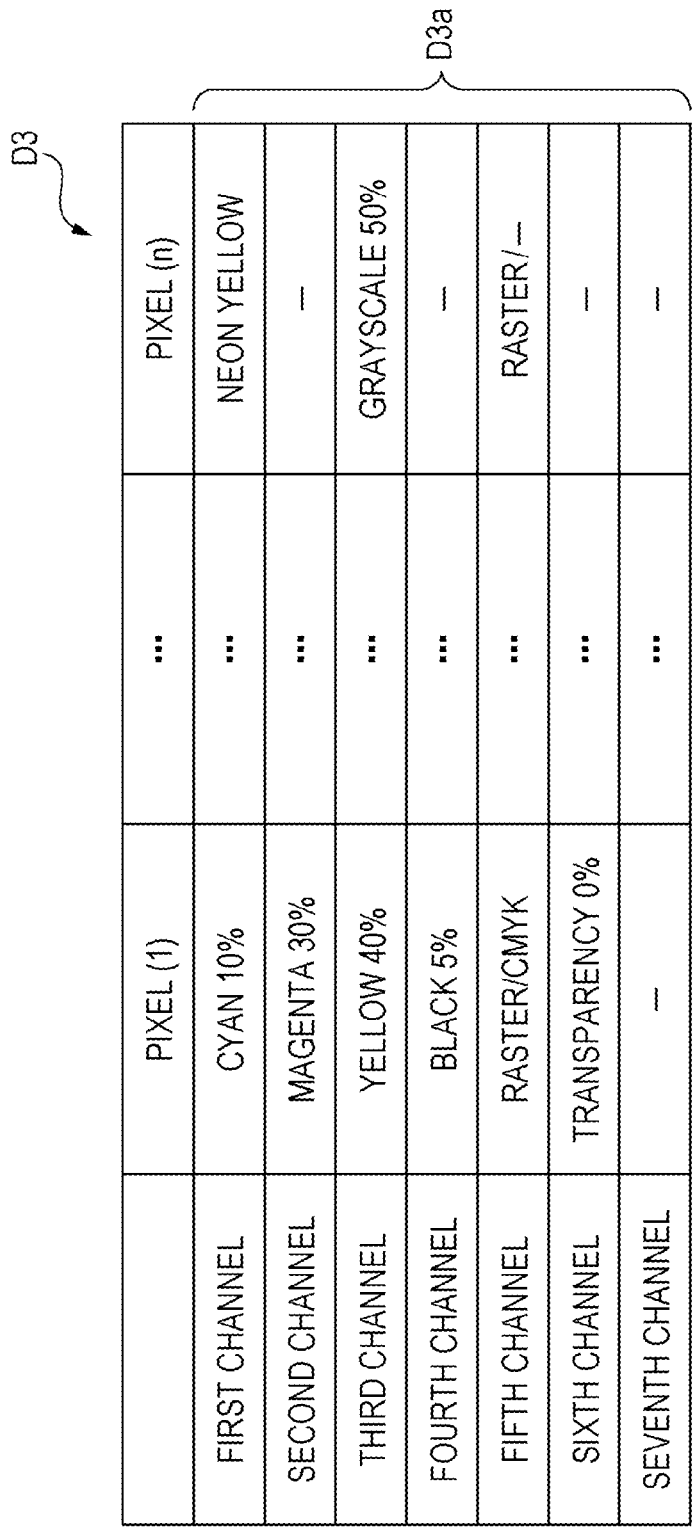
FIG. 4 is a diagram illustrating an example of information for each pixel of the preview data.

The file format of the preview data D3 is not particularly limited, but is preferably a format in which information such as a color value is described for each pixel as illustrated in FIG. 4 which will be described in detail later, like data in a raster format or data in an equivalent format thereof, for example, from the viewpoint that the processing load at the time of the display of the preview is smaller than that of the data in the vector format. Here, the preview data D3 includes color related information in which a process color and a spot color are distinguished from each other for each pixel as will be described in detail later. For this reason, even when the setting related to the spot color is changed, the preview can be appropriately updated using the preview data D3 without using the image data D1.

The print setting information D4 is information related to various types of print settings in the printing device 300. In the example illustrated in FIG. 1, the print setting information D4 includes color replacement information D4a and profile information D4b. The print setting information D4 includes change history information related to a setting change history in addition to setting information of the color replacement information D4a and the profile information D4b.

The color replacement information D4a is information indicating that a part or all of the colors included in the image data D1 or the print data D2 are replaced with other colors. The profile information D4b is information related to a setting of a profile such as an input profile applied to the image data D1. For example, the profile is embedded in the image data D1 or implemented in the image processing program PG, and includes a conversion table for converting a color value in one color space as an input value into a color value in another color space as an output value. A format of the profile is not particularly limited, but conforms to International Color Consortium (ICC) specifications, for example. Note that the information included in the print setting information D4 is not limited to the color replacement information D4a and the profile information D4b. For example, the print setting information D4 may include setting information other than the color replacement information D4a and the profile information D4b.

The communication device 40 is an interface that is communicably connected to external devices such as the display device 200, the printing device 300, and the input device 400. For example, the communication device 40 includes interfaces such as a universal serial bus (USB) interface and a local area network (LAN) interface. Note that the communication device 40 may be wirelessly connected to the external device by Wi-Fi, Bluetooth, or the like, or may be connected to the external device via the local area network (LAN), the Internet, or the like. Note that Wi-Fi and Bluetooth are both registered trademarks.

In the information processing apparatus 1 having the above-described configuration, the processing device 10 reads and executes the image processing program PG from the storage device 20. By this execution, the processing device 10 functions as the processing section 11. The processing section 11 has a function of accepting an instruction from a user through the input device 400 and a function of controlling operations of the display device 200 and the printing device 300.

The processing section 11 generates the print data D2 and the preview data D3 based on the image data D1. RIP processing including rasterizing processing for the image data D1 is used to generate both the print data D2 and the preview data D3. The setting indicated by the print setting information D4 described above is appropriately applied to the RIP processing. Note that in the present specification, the "rasterizing processing" is a concept including not only processing for converting data in a vector format into data in a raster format but also processing for converting data in a raster format into data in a raster format having a different resolution or the like.

Figure 3:
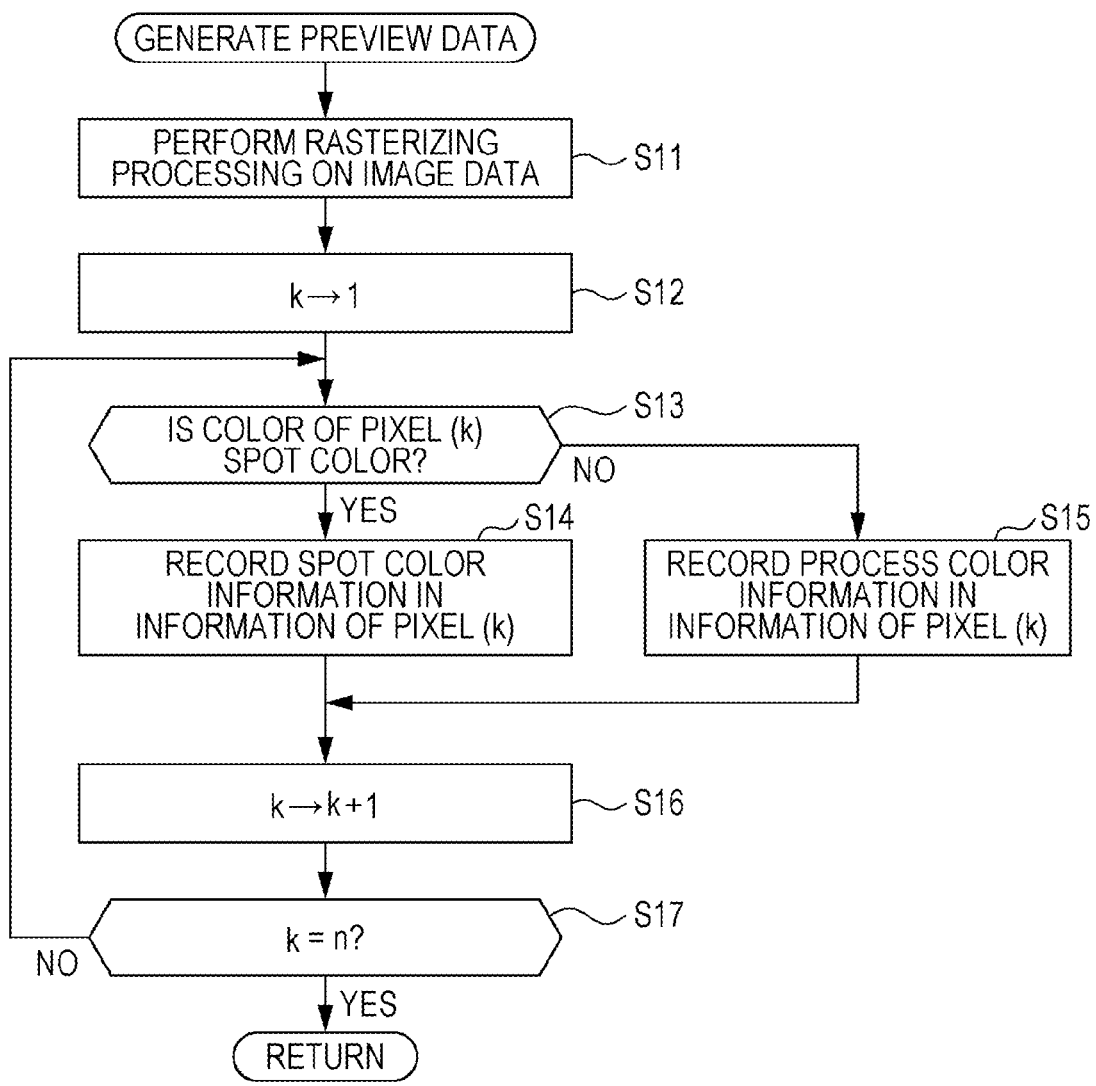
FIG. 3 is a flowchart illustrating a generation method of preview data.

The generation of the preview data D3 uses, in addition to the above-described RIP processing, processing for recording information related to a color for each pixel which is obtained by an analysis at the time of the RIP processing in the preview data D3 as illustrated in FIG. 3 which will be described in detail later. Note that the RIP processing used to generate the preview data D3 may be processing in the same process as the RIP processing used to generate the print data D2 or may be processing in a different process. When the RIP processing used to generate the preview data D3 is the processing in a different process from that of the RIP processing used to generate the print data D2, these processing contents may be different from each other. For example, the resolution of the raster data obtained by the RIP processing used to generate the preview data D3 may be different from the resolution of the raster data obtained by the RIP processing used to generate the print data D2, and is preferably smaller than the resolution of the raster data obtained by the RIP processing used to generate the print data D2.

Figure 5:
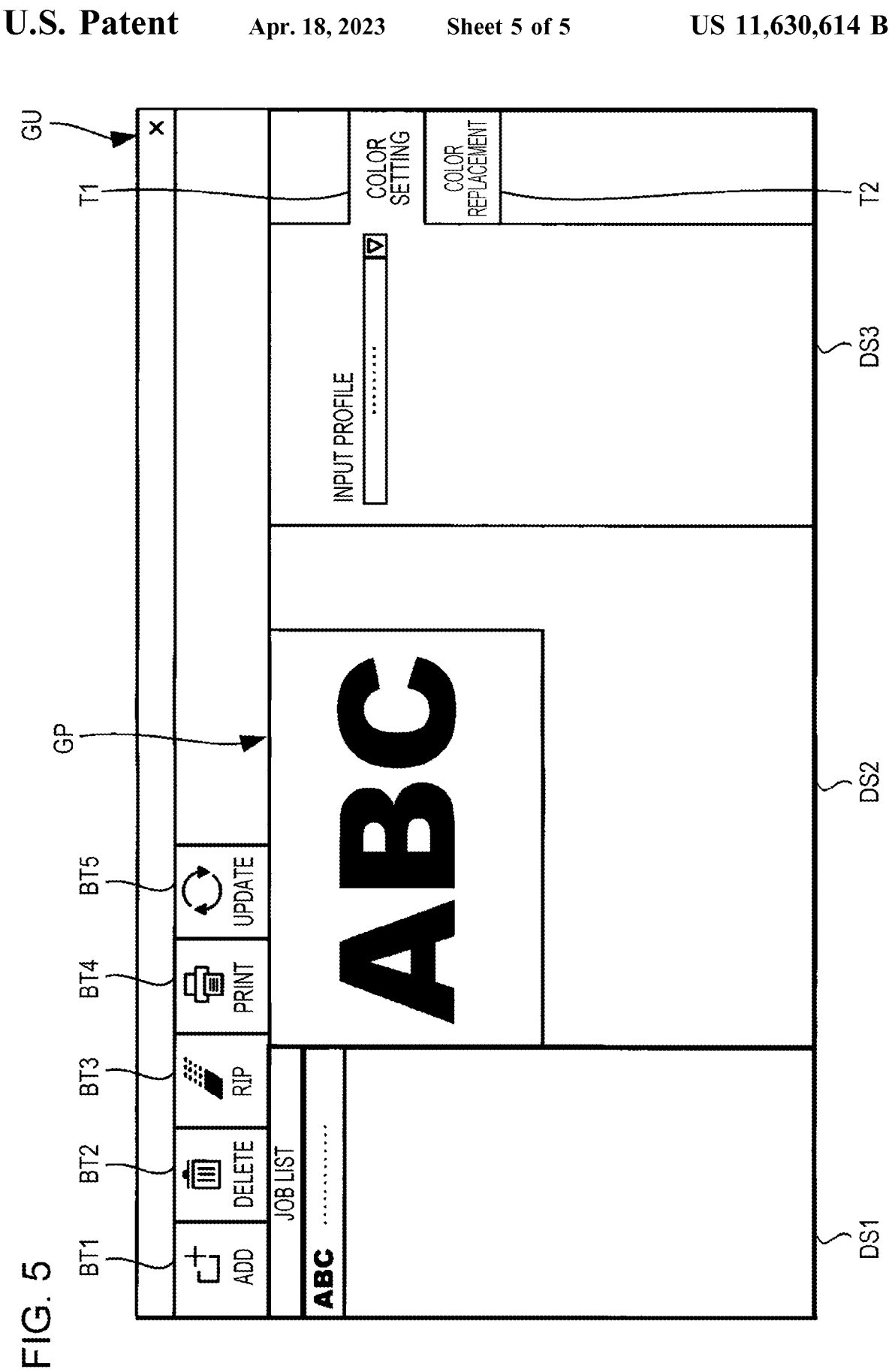
FIG. 5 is a diagram illustrating an example of an image for generating print data and displaying a preview.

In addition, as illustrated in FIG. 5 which will be described later in detail, the processing section 11 causes the display device 200 to display an image used for the printing by the printing device 300 and the printing setting. The image is a graphical user interface (GUI) image for accepting an instruction from the user via the input device 400.

1-3. Operation of Information Processing Apparatus 1

Figure 2:
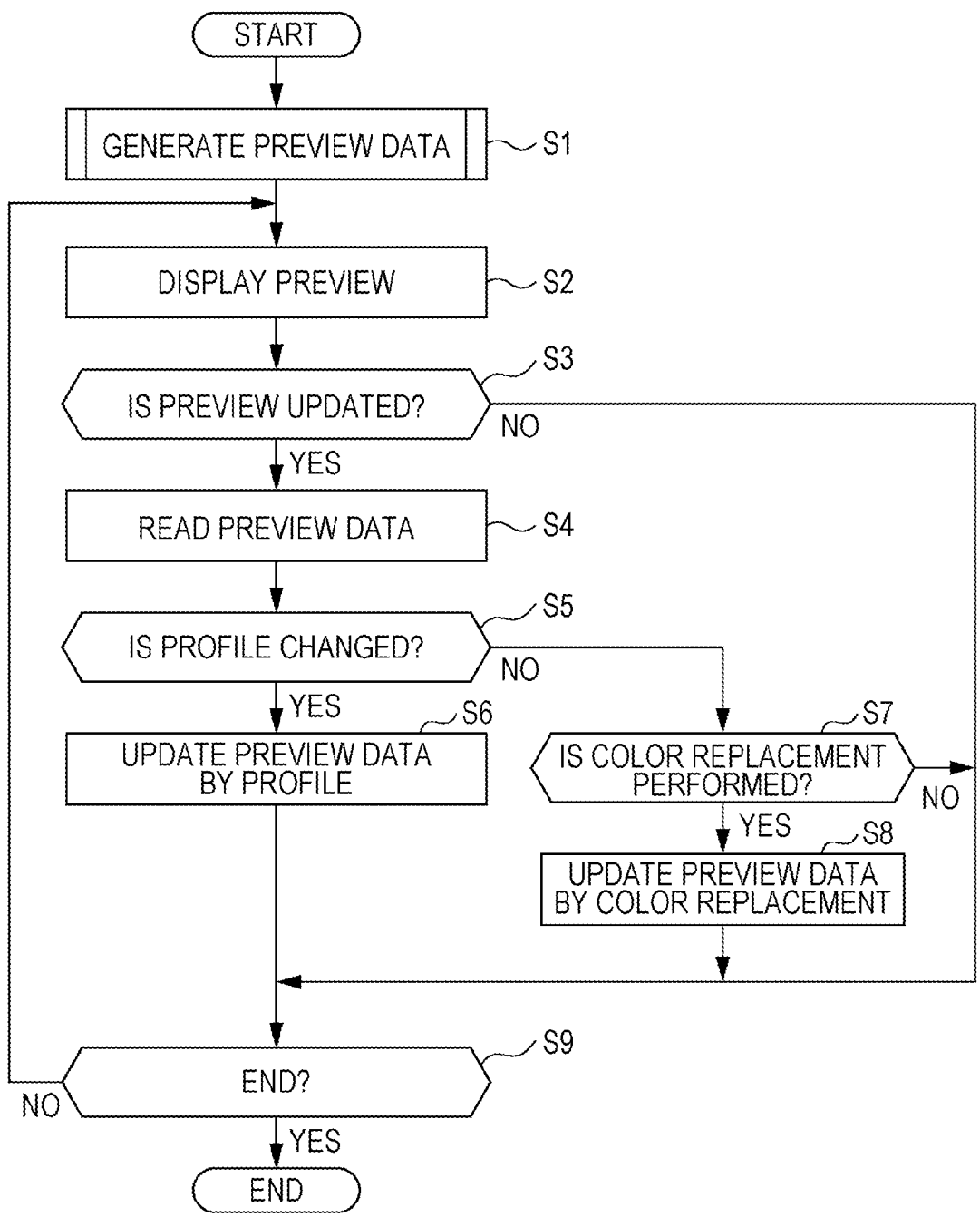
FIG. 2 is a flowchart illustrating an image processing method according to the embodiment.

FIG. 2 is a flowchart illustrating an image processing method according to the embodiment. The image processing method is performed using the information processing apparatus 1. First, in step S1, the processing section 11 generates the preview data D3. The generated preview data D3 is stored in the storage device 20. Note that the generation of the preview data D3 will be described in detail with reference to FIG. 3 below.

Next, in step S2, the processing section 11 causes the display device 200 to display an image based on the preview data D3 as a preview. Thereafter, in step S3, the processing section 11 determines whether or not the update of the preview is accepted.

When the update of the preview is not accepted, in step S9, the processing section 11 determines whether or not there is an instruction to end. When there is no instruction to end, the processing section 11 proceeds to step S2, and on the other hand, when there is an instruction to end, the processing is ended.

On the other hand, when the update of the preview is accepted, in step S4, the processing section 11 reads the preview data D3 from the storage device 20. Thereafter, in step S5, the processing section 11 determines whether or not the setting of the profile is changed. This determination is made based on, for example, the change history information included in the print setting information D4.

When the setting of the profile is changed, in step S6, the processing section 11 uses the preview data D3 and the profile information D4b to update the data used for the preview, and then proceeds to step S9. On the other hand, when the setting of the profile is not changed, in step S7, the processing section 11 determines whether or not the setting of the color replacement is changed. This determination is made based on, for example, the change history information included in the print setting information D4.

When the setting of the color replacement is changed, in step S8, the processing section 11 updates the data used for the preview using the preview data D3 and the color replacement information D4a, and then proceeds to step S9.

On the other hand, when the setting of the color replacement is not changed, the processing section 11 proceeds to step S9 without executing step S8.

According to the above-described image processing method, the preview data D3 having a smaller data size than that of the print data D2 is generated in step S1 described above by using the raster data obtained by performing the rasterizing processing on the image data D1. In step S1 described above, the preview data D3 is stored in the storage device 20, which is an example of the "storage section". Further, when the update of the preview of the print image based on the print data D2 is accepted, the preview data D3 read from the storage device 20 is used to update the data used for the preview in the above-described step S3 to step S8. Hereinafter, the above-described step S1 will be described in detail.

FIG. 3 is a flowchart illustrating a generation method of the preview data D3. FIG. 3 illustrates an example in which the rasterizing processing is performed on the image data D1, and the preview data D3 is generated using raster data composed of n pixels obtained by the rasterizing processing. In FIG. 3, the k-th pixel among the n pixels is represented as a pixel (k). Where n is a natural number of 1 or more, and k is a natural number greater than or equal to 1 and less than or equal to n.

In step S1 described above, first, in step S11, the processing section 11 performs the rasterizing processing on the image data D1. The raster data composed of n pixels is generated by the rasterizing processing. In the rasterizing processing, information related to a color is analyzed for each pixel of the raster data. The raster data is stored in the storage device 20 together with information of the analysis. Here, it is sufficient when n is a natural number of 1 or more, and n is not particularly limited, but is preferably the number corresponding to the number of pixels having a resolution higher than or equivalent to a display resolution of the display device 200, and also the number corresponding to the number of pixels having a resolution lower than or equivalent to a resolution of the print data D2. Note that the raster data may be the print data D2.

Next, in step S12, the processing section 11 sets 1 in k. Thereafter, in step S13, the processing section 11 determines whether or not the color of the pixel (k) is a spot color. This determination is made based on the information of the analysis related to the color in the rasterizing processing in step S11 described above.

When the color of the pixel (k) is the spot color, the processing section 11 records spot color information indicating the spot color in the information of the pixel (k) of the raster data in step S14. On the other hand, when the color of the pixel (k) is not a spot color, the processing section 11 records process color information indicating a process color in the information of the pixel (k) of the raster data in step S15.

After step S14 and step S15 as described above, the processing section 11 sets k+1 in k in step S16. Thereafter, in step S17, the processing section 11 determines whether k=n. When it is not k=n, the processing section 11 returns to the step S13 described above. On the other hand, when k=n, the processing section 11 proceeds to step S2 illustrated in FIG. 2 described above.

By the above-described steps S11 to S17, the preview data D3 that is composed of the n pixels and also includes the information related to the color for each pixel is generated.

FIG. 4 is a diagram illustrating an example of information D3a for each pixel of the preview data D3. FIG. 4 illustrates an example in which information indicating a process color is recorded in the information D3a of the first pixel (1) and information indicating a spot color is recorded in the information D3a of the n-th pixel (n). In addition, FIG. 4 exemplifies a case in which the process color is CMYK, and also the spot color is a neon color.

In the example illustrated in FIG. 4, the information D3a of a pixel is represented by using seven channels. Specifically, when the pixel uses the process color, a usage rate of cyan is recorded in the first channel, a usage rate of magenta is recorded in the second channel, a usage rate of yellow is recorded in the third channel, and a usage rate of black is recorded in the fourth channel, information indicating whether a data format of the image data D1 is the vector format or the raster format and information of a color space of an input are recorded in the fifth channel, and auxiliary data is recorded in each of the sixth channel and the seventh channel.

On the other hand, when the pixel uses a spot color, an ID of the spot color is recorded in each of the first channel and the second channel, a grayscale is recorded in the third channel, the fourth channel is a spare channel, information indicating whether the format of the image data D1 is the vector format or the raster format and information of the color space of the input are recorded in the fifth channel, and each of the sixth channel and the seventh channel is an empty channel.

As described above, the information D3a related to the color is recorded for each pixel in the preview data D3. Note that the information D3a for each pixel of the preview data D3 is not limited to the example illustrated in FIG. 4.

FIG. 5 is a diagram illustrating an example of an image GU for generating print data and displaying a preview. With the execution of the image processing program PG, for example, as illustrated in FIG. 5, the information processing apparatus 1 causes the display device 200 to display the image GU for GUI including a preview image GP based on the above-described preview data D3 as an application window. Note that although FIG. 5 illustrates a case in which the preview image GP represents characters "ABC", the contents of the preview image GP are not limited to the example illustrated in FIG. 5 and is optionally selected.

The image GU includes buttons BT1 to BT5 and display fields DS1 to DS3 in addition to the preview image GP.

The button BT1 is a button for inputting the image data D1. One or more pieces of image data D1 added by the operation of the button BT1 are displayed in the display field DS1. When a plurality of pieces of image data D1 are displayed in the display field DS1, one of the plurality of pieces of image data D1 can be selected.

The button BT2 is a button for deleting the image data D1 displayed in the display field DS1. By operating this button, the display of the image data D1 is deleted from the display field DS1. Here, when a plurality of pieces of image data D1 are displayed in the display field DS1, the selected image data D1 is deleted from the display field DS1.

The button BT3 is a button for performing the RIP processing on the image data D1. By the operation of this button, the processing in step S1 and step S2 in FIG. 2 described above is executed for the image data D1 displayed in the display field DS1. As a result of the above-described processing, the print data D2 and the preview data D3 are generated, and also the preview image GP based on the preview data D3 is displayed in the display field DS2. Here, when a plurality of pieces of image data D1 are displayed in the display field DS1, the processing is executed for the selected image data D1.

The button BT4 is a button for printing an image based on the print data D2. By operating this button, the printing device 300 prints the image based on the print data D2. Here, when the operation of the button BT3 is not yet performed, the above-described RIP processing is performed and then the printing is performed by the printing device 300. In addition, when a plurality of pieces of image data D1 are displayed in the display field DS1, the selected image data D1 is printed.

The button BT5 is a button for updating the preview image GP. By the operation of this button, the processing in steps S3 to S8 in FIG. 2 described above is executed for the image data D1 displayed in the display field DS1. The preview image GP is updated by the processing.

The display field DS3 includes a tab T1 and a tab T2 that can be alternatively selected. When the tab T1 is selected, an image for a color setting including a profile setting is displayed in the display field DS3. The setting of the profile can be changed by an operation on the image. When the tab T2 is selected, an image for a setting of a color replacement is displayed in the display field DS3. The setting of the color replacement can be changed by an operation on the image.

As described above, the aforementioned information processing apparatus 1 includes the processing section 11 and the storage device 20 which is an example of the "storage section". The processing section 11 generates, based on the image data D1, the print data D2 obtained by performing the rasterizing processing on the image data D1 and the preview data D3 that is smaller in data size than the print data D2. The storage device 20 stores the preview data D3.

In particular, when the processing section 11 accepts the update of the preview of the print image based on the print data D2, the processing section 11 uses the preview data D3 read from the storage device 20 to update the data used for the preview. Therefore, as compared with a case in which the image data D1 is used for the update, the preview of the print image can be more quickly displayed.

According to the present embodiment, as described above, the processing section 11 causes the display device 200, which is an example of the "display section", to display the preview image GP, which is an image based on the preview data D3, as the preview. Therefore, the preview of the print image can be displayed on the display device 200.

In addition, as described above, the processing section 11 discriminates whether the color of the raster data obtained by performing the RIP processing on the image data D1 is the process color or the spot color for each pixel, and generates the preview data D3 including the information D3a related to a result of the discrimination by using the raster data. Therefore, in a case in which the spot color is used as the color of the image indicated by the image data D1, even when the spot color is replaced with the alternative color by the rasterizing processing of the image data D1, the information of the pixel using the spot color can be held in the preview data D3. As a result, even when the print setting is changed before the preview is updated for the pixel using the spot color, the preview of the print image can be accurately displayed without using the image data D1.

Here, as described above, when the update of the preview is accepted and also the print setting of the print image is changed, the processing section 11 changes the data used for the preview by using the print setting information D4 related to the print setting in addition to the preview data D3 read from the storage device 20. Therefore, even when the print setting is changed before the preview is updated, it is possible to display the preview reflecting the changed contents of the print setting.

According to the present embodiment, as described above, the print setting information D4 includes the color replacement information D4a related to the color replacement setting. When the update of the preview is accepted and also the setting of the color replacement is changed, the processing section 11 changes the data used for the preview based on the preview data D3 read from the storage device 20 and the color replacement information D4a. Therefore, even when the setting of the color replacement is changed before the preview is updated, it is possible to display the preview reflecting the changed contents of the setting.

Here, as described above, when the update of the preview is accepted and also the setting of the color replacement is changed, the processing section 11 searches for the pixel corresponding to the input color of the color replacement indicated by the color replacement information D4a from the preview data D3 read from the storage device 20, and changes the data used for the preview by using a result of the search. Therefore, as compared with a case in which the search is not performed, it is possible to more quickly display the preview reflecting the changed contents of the setting of the color replacement.

In addition, as described above, the print setting information D4 includes the profile information D4b related to the setting of the profile. When the update of the preview is accepted and also the setting of the profile is changed, the processing section 11 changes the data used for the preview based on the preview data D3 read from the storage device 20 and the profile information D4b. Therefore, even when the setting of the profile is changed before the preview is updated, the preview reflecting the changed contents of the setting can be displayed.

Here, as described above, when the update of the preview is accepted and also the setting of the profile is changed, the processing section 11 performs a profile conversion by the profile indicated by the profile information D4b using the color value of the preview data D3 read from the storage device 20 as the input value, and changes the data used for the preview by using a result of the conversion. Therefore, as compared with a case in which the profile conversion is not performed, it is possible to more quickly display the preview reflecting the changed contents of the profile setting.

2. Modified Example

The aforementioned respective exemplary embodiments may be modified in various ways. Specific modification aspects applicable to the above-described respective embodiments will be exemplified below. It should be noted that two or more aspects optionally selected from the following examples may be appropriately combined as long as they do not contradict each other.

According to the above-described embodiment, a configuration in which the image processing program PG is installed in a computer such as a personal computer is exemplified, but the present disclosure is not limited to the configuration. For example, the image processing program PG may be installed in an output device such as a printer or a portable device such as a tablet terminal or a smartphone.

What is claimed is:

1. An information processing apparatus in communication with a printing device, the information processing apparatus comprising:
   a processing section that generates, based on image data, print data obtained by performing RIP processing on the image data and preview data smaller in data size than the print data; and
   a storage section that stores the preview data, wherein when an update of a preview of a print image based on the print data is accepted, the processing section updates data used for the preview by using the preview data read from the storage section, and the processing section of the information processing apparatus discriminates whether a color of raster data obtained by performing the RIP processing on the image data is a process color or a spot color per pixel, and generates the preview data including information related to a result of the discrimination by using the raster data, the information for the spot color per pixel is held as part of the preview data even if the spot color per pixel is updated by performing RIP processing of the image data so that the preview of the print image is displayed without using the image data.

2. The information processing apparatus according to claim 1, wherein the processing section causes a display section to display an image based on the preview data as the preview.

3. The information processing apparatus according to claim 1, wherein when an update of the preview is accepted and also a print setting of the print image is changed, the processing section changes the data used for the preview by using print setting information related to the print setting in addition to the preview data read from the storage section.

4. The information processing apparatus according to claim 3, wherein
the print setting information includes color replacement information related to a setting of a color replacement, and
when the update of the preview is accepted and also the setting of the color replacement is changed, the processing section changes the data used for the preview based on the preview data read from the storage section and the color replacement information.

5. The information processing apparatus according to claim 4, wherein when the update of the preview is accepted and also the setting of the color replacement is changed, the processing section searches for a pixel corresponding to an input color of the color replacement indicated by the color replacement information from the preview data read from the storage section, and changes the data used for the preview by using a result of the search.

6. The information processing apparatus according to claim 3, wherein
the print setting information includes profile information related to a setting of a profile, and
when the update of the preview is accepted and also the setting of the profile is changed, the processing section changes the data used for the preview based on the preview data read from the storage section and the profile information.

7. The information processing apparatus according to claim 6, wherein when the update of the preview is accepted and also the setting of the profile is changed, the processing section performs a profile conversion by the profile indicated by the profile information using a color value of the preview data read from the storage section as an input value, and changes the data used for the preview using a result of the profile conversion.

8. An image processing method performed by an information processing apparatus in communication with a printing device, the image processing method comprising:
generating preview data smaller in data size than print data by using raster data obtained by performing RIP processing, including rasterizing processing, on image data;

storing the preview data in a storage section; and updating, when an update of a preview of a print image based on the print data is accepted, data used for the preview by using the preview data read from the storage section, the data including information related to a result of a discrimination of whether a color of raster data obtained by performing the RIP processing on the image data is a process color or a spot color per pixel and information for the spot color per pixel that is held as part of the preview data even if the spot color per pixel is updated by performing RIP processing of the image data so that the preview of the print image is displayed without using the image data.

9. A non-transitory computer-readable storage medium storing an image processing program for causing a computer in communication with a printing device to execute:

generating preview data smaller in data size than print data by using raster data obtained by performing RIP processing, including rasterizing processing, on image data;

storing the preview data in a storage section; and updating, when an update of a preview of a print image based on the print data is accepted, data used for the preview by using the preview data read from the storage section, the data including information related to a result of a discrimination of whether a color of raster data obtained by performing the RIP processing on the image data is a process color or a spot color per pixel and information for the spot color per pixel that is held as part of the preview data even if the spot color per pixel is updated by performing RIP processing of the image data so that the preview of the print image is displayed without using the image data.

* * * * *